United States Patent [19]

Staley et al.

[11] Patent Number: 5,391,926
[45] Date of Patent: Feb. 21, 1995

[54] WIND TURBINE PARTICULARLY SUITED FOR HIGH-WIND CONDITIONS

[76] Inventors: Frederick J. Staley, 1403 N. College Ave., #5; Dillyn M. Elder, 1513 N. College Ave., #18, both of Fort Collins, Colo. 80524

[21] Appl. No.: 232,323
[22] Filed: Apr. 25, 1994

Related U.S. Application Data

[63] Continuation of Ser. No. 931,872, Aug. 18, 1992, abandoned.
[51] Int. Cl.⁶ ............................................. F03D 3/04
[52] U.S. Cl. ........................................ 290/55; 290/44; 415/907; 416/197 A
[58] Field of Search ................... 290/44, 55; 415/4.2, 415/4.4, 907; 416/197 A, 235, 236 R

[56] References Cited

U.S. PATENT DOCUMENTS

| | | | |
|---|---|---|---|
| 143,100 | 9/1873 | Sheplar et al. | 416/197 A |
| 175,530 | 3/1876 | Vernor | 416/197 A |
| 201,400 | 3/1878 | Everhart | 415/4.4 |
| 399,171 | 3/1889 | Townsend | 416/139 |
| 455,858 | 7/1891 | Pepper | 416/197 A |
| 485,933 | 11/1892 | Herman | 416/119 |
| 535,193 | 3/1895 | Chapman | 415/4.2 |
| 537,494 | 4/1895 | Stevens et al. | 415/907 |
| 588,572 | 8/1897 | Hardaway | 415/4.2 |
| 600,893 | 3/1898 | Schmucker | 415/4.4 |
| 640,901 | 1/1900 | Hardaway | 415/3.1 |
| 993,120 | 5/1911 | Sterner | 415/4.4 |
| 1,523,295 | 1/1925 | Ryan | 415/4.2 |
| 1,583,165 | 5/1926 | Nicholson | 416/236 R |
| 1,615,675 | 1/1927 | Bender | 415/4.4 |
| 1,758,560 | 5/1930 | Currie | 416/236 R |
| 1,835,018 | 12/1931 | Darrieus | 415/224 |
| 1,935,097 | 11/1933 | Nelson | 415/4.2 |
| 2,067,542 | 1/1937 | Penton | 416/51 |
| 2,406,268 | 8/1946 | Terhune | 416/46 |
| 3,339,078 | 8/1967 | Crompton | 290/44 |
| 3,902,072 | 8/1975 | Quinn | 290/44 |
| 3,942,909 | 3/1976 | Yengst | 416/132 B |
| 3,970,409 | 7/1976 | Luchuk | 416/145 |
| 3,994,621 | 11/1976 | Bogle | 415/186 |
| 4,035,658 | 7/1977 | Diggs | 290/55 |
| 4,075,500 | 2/1978 | Oman et al. | 290/55 |
| 4,140,433 | 2/1979 | Eckel | 415/209.1 |
| 4,168,439 | 9/1979 | Palma | 290/44 |
| 4,204,799 | 5/1980 | de Geus | 415/4.5 |
| 4,247,252 | 1/1981 | Seki et al. | 416/44 |
| 4,247,253 | 1/1981 | Seki et al. | 416/44 |
| 4,291,233 | 9/1981 | Kirschbaum | 290/1 C |
| 4,362,470 | 12/1982 | Lacastro et al. | 416/197 A |
| 4,405,144 | 9/1983 | Loth | 415/1 |
| 4,415,814 | 11/1983 | Martinez | 290/55 |
| 4,474,529 | 10/1984 | Kinsey | 415/4.2 |
| 4,551,631 | 11/1985 | Trigilio | 290/55 |
| 4,571,152 | 2/1986 | Tatar | 415/4.2 |
| 4,632,637 | 12/1986 | Traudt | 416/41 |
| 4,652,206 | 3/1987 | Yeoman | 415/4.2 |
| 4,695,736 | 9/1987 | Doman et al. | 290/44 |
| 4,748,339 | 5/1988 | Jamieson | 290/55 |
| 4,818,181 | 4/1989 | Kodric | 416/196 A |
| 4,834,610 | 5/1989 | Bond, III | 415/3.1 |
| 4,850,792 | 7/1989 | Yeoman | 415/4.2 |
| 5,083,039 | 1/1992 | Richardson et al. | 290/44 |

FOREIGN PATENT DOCUMENTS

| | | | |
|---|---|---|---|
| 167694 | 1/1986 | European Pat. Off. | 415/4.2 |
| 0216384 | 4/1987 | European Pat. Off. | |
| 515652 | 4/1921 | France. | |
| 727519 | 6/1932 | France. | |
| 61140 | 3/1955 | France | 416/236 |
| 867380 | 2/1953 | Germany. | |
| 69701 | 5/1980 | Japan | 416/197 A |
| 2231805 | 11/1990 | United Kingdom. | |

Primary Examiner—A. D. Pellinen
Assistant Examiner—Robert Lloyd Hoover

[57] ABSTRACT

A vertical-axis, high-wind turbine for use with an electrical generator for producing power by converting the energy of wind currents into mechanical, rotational energy, which is then used to operate the electrical generator. Fixed, stationary stators, while providing significant structural integrity, direct currents having horizontal components into a rotor assembly, where the rotors of this assembly are responsive to the currents by imparting rotation upon a central vertical shaft. Both stators and rotors are designed with functional curved blades for greater efficiency in operation. In fact, the stators are designed with a double-curve which in many ways, discussed herein, perform at levels higher than either straight, or single-curved stators. The present turbine is not equipped with any braking system, or feathering system to withstand the high winds; instead, it is capable of actual operation and energy conversion of these high energy-potential winds.

41 Claims, 7 Drawing Sheets

WIND TURBINE PARTICULARLY SUITED FOR HIGH-WIND CONDITIONS

This is a continuation of application Ser. No. 07/931,872, filed Aug. 18, 1992, and now abandoned.

FIELD OF THE INVENTION

The present invention relates to wind turbines used to convert wind energy into mechanical energy, more specifically high-wind, vertical-axis turbines. Vertical-axis turbines are typically of a long axis type, allowing large columns of air to be harnessed. These devices differ from horizontal-axis (propeller) type windmills, which typically rotate about a vertical axis in order that they may face directly into a wind. The present invention more specifically relates to high-wind, vertical-axis turbines designed to be employed as a cost-effective alternate power source.

BACKGROUND OF THE INVENTION

Wind as a source of energy is a concept that has been promoted for some time. According to one source, there is evidence which shows that windmills were in use in Babylon and in China as early as 2000 B.C. The U.S. Patent and Trademark Office has granted patents on windmill devices dating back to the early to mid 1800's.

Despite the continued research and development in this age old technology, until the present invention no windmill or wind turbine device has successfully addressed some of the most important problems which have seemingly made the harnessing of wind economically infeasible. While wind is unquestionably a large potential source of energy—estimated to be about 5 kW per acre in the United States—its variability in velocity has made it an unreliable source. Many devices, such as U.S. Pat. Nos. 4,850,792 to Yeoman, 4,035,658 to Diggs, and 2,406,268 to Terhune have relied on the ability of concentrating low to moderate winds for producing power. Others, like those shown in U.S. Pat. Nos. 4,834,610 to Bond, III, and 4,075,500 to Oman et al. (a horizontal-axis turbine), have accomplished the harnessing variable wind speeds by using modern variable speed governors. No device currently known to the present inventors is capable of adequately harnessing high-winds for power production. High-winds are characterized, for purposes of discussion, by currents having average velocities above 45 m.p.h., or by having gusts greater than 60 m.p.h. Many devices are designed to fold and/or feather in winds reaching certain levels. Such devices are illustrated in U.S. Pat. Nos. 4,818,181 to Kodric, 4,632,637 to Traudt, and 3,942,909 to Yengst. These techniques, while intended to protect the structural integrity of the windmill, decrease a device's ability to produce power. Until the present invention high-winds have been an untapped source of energy by those skilled in the relevant art.

Perhaps one of the biggest, reasons for the lack of high-wind turbines has to do with the structural integrity of typical wind devices. By design many are lightweight, inadequately supported, and made from insufficient materials. A number of these devices are comprised of a multitude of moving parts, such as rotors, stators, vanes, shields, and the like. These parts not only compromise the integrity of the machine, but also require continuous maintenance, repair and/or replacement. For such a device, which may produce only a few kilowatts of power, the costs soon begin to outweigh the benefits. Another concept widely using is to build large multi-story wind turbines capable of producing at or near the megawatt level. Two such devices are shown in U.S. Pat. Nos. 3,902,072 to Quinn, and 3,994,621 to Bogie. It is believed that these devices would cost close to $100 million to build and several hundred thousand to maintain each year. Another example is the 1.25-MW generator installed near Rutland, Vt. This is believed to be the largest windmill ever built in the United States, having two main blades each 175 feet in diameter. This facility operated intermittently between 1941 and 1945, during the war years when most resources were being used for war efforts. In 1945 one of the blades broke due to material fatigue and was never repaired—presumably due to a lack of cost efficiency. Similar to the smaller units, these large devices become cost prohibitive on a much larger scale. The present invention solves this second problem by presenting a low-cost, low-maintenance, cost-efficient wind turbine. While certain aspects of the design have been known, until the present invention the proper combination of elements, new and old, has not been achieved to provide a commercially viable product.

Variable wind velocity is not, of course, the only obstacle in harnessing kinetic energy from the wind. Wind direction has been another area of study and development. Wind currents are typically unpredictable, and due to topography, upper air disturbances, changing weather patterns, or seasonal variations, they rarely blow in the same direction for any substantial length of time. For this reason effective wind machines must be capable of immediately accommodating winds from a full 360°. Some devices have attempted to accomplish this goal with pivoting shields, and stators or wind directing vanes. U.S. Pat. Nos. 4474529 to Kinsey, 537494 to Stevens et al., the Yengst patent, and many other devices illustrate such an approach. As mentioned previously, additional moving parts usually detract from a machine's cost effectiveness. While not in the field of the present invention, horizontal-axis machines typically pivot the entire rotor assembly so that it may face upwind. Still other designs leave the rotor assembly open—that is, no wind directing vanes or stators are utilized—so that winds from any horizontal direction may impart rotation upon the rotor assembly. This leaves the rotor completely open to the harshness and destructive abilities of the wind. Once again the present invention solves this problem by providing 360 degrees of wind reception, in all types of wind conditions.

The present invention, in its various embodiments, recognizes and addresses these and other problems and overcomes many limitations encountered by those skilled in the art. Many devices and procedures have taught the use of folding or feathering in high-wind conditions, but none have been able to realize the potential power of high-winds. Until the present invention, it has not been known to take the approach of utilizing stationary metal stators as both wind directing means and for structural support, despite the long felt need for an effective alternate energy source, and the existence of the necessary implementing arts. Problems such as high cost, and high maintenance of most wind energy facilities exist in the field, but such problems have not been adequately addressed by those skilled in the art. While high velocity wind is a well known natural occurrence with high kinetic energy, its value in the field of vertical-axis wind turbines has gone virtually ignored because those skilled in the art failed to address the aspects of structural integrity, durability, and reliability. The recognition by the present inventors that the problems encountered in conventional vertical-axis turbines could be solved by using stationary wind directing blades in part afforded the commercially-desirable result. The prior art has taught away from the present invention by stressing straight pivotable stators. Other areas of teaching away by the prior art relate to rotor attachment, and stator curvature. Rather than supplying a system which affords only an incremental increase in performance over the prior art, the present invention utilizes techniques which were not previously considered in order to achieve leaps in performance compared to the prior art. Further, the present invention has achieved the utilization of a previously untapped natural resource, namely high winds.

SUMMARY OF THE INVENTION

The present invention discloses a wind turbine to operate in all wind conditions, such as velocities up to 130 mph, and frequently changing wind directions. The device provides a reliable and effective means for directing air currents into and out of the rotor assembly which is attached directly to a rotatable vertical shaft. Rather than supplying a system which affords only an incremental increase in performance and design over the prior art, the present invention utilizes combinations and techniques which were not previously considered to achieve an increase in performance unparalleled by the prior art. This invention serves to operate with a minimum number of movable parts and systems, to optimize potential power production by allowing energy from high winds to be harnessed as well as low and moderate winds, and to optimize air current intake by providing immediate accommodations to winds from any given direction.

In general terms, the invention involves various embodiments of a vertical-axis wind turbine. Many of the elements of this device achieve several different objectives which, when combined, act to achieve the mentioned increases in performance. In the preferred embodiment, the invention discloses double-curved, stationary stators for more effectively directing currents into the rotor assembly to impart a higher rotational velocity and greater torque upon the turbine shaft. In addition, the stationary stators provide a structural integrity necessary for operation during high-wind conditions. This aspect also prevents the disruption of rotation by shielding the rotors from winds counter-directional to their rotation which may occur as the wind shifts. Still other features of the present device include textured interior surfaces on the rotors which allows for the realization of higher drag on the inside of the rotors for greater rotational velocity.

Importantly, the invention breaks from several time-honored traditions in harnessing wind energy. While drawing from some of the important conditions demanded of these devices for providing an effective energy source, the invention expands upon these conditions in an effort to provide an effective device during high-wind conditions. By recognizing and utilizing the potential energy of high-winds, and by designing an apparatus with resistance to the destructiveness of these winds during standard operation the present invention achieves its goals.

Accordingly, the present invention provides a high-wind, vertical-axis turbine. The stated invention acts to convert wind currents into mechanical energy used to directly act upon a water pump, or to drive an electrical generator for use as an alternate power source. The turbine may be equipped with any number of rotors and stators which interact with the variable wind currents during operation. These elements are designed, in one embodiment, with curves to achieve greater rotational velocity, increased structural integrity, and to better direct currents. In addition, ribs can be used on the interior surface of the rotors for an advantage which is twofold. First, it will increase the coefficient of drag on the interior of the rotor, and second it will provide increased structural rigidity. In addition, a minimum of moving parts is used to increase reliability, to decrease maintenance, and to decrease production costs.

It is broadly an object of the present invention to provide a design which is capable of operation in a variety of wind conditions. Such conditions include, but are not limited to, winds from any direction which possesses a horizontal component, even where such wind direction is capable of frequent changes, winds reaching velocities of 130 m.p.h. or more, and winds with continuously changing velocities. It is an object that the present invention be capable of standard operation during these conditions without any need for employing folding and feathering techniques, or a speed control or braking system.

It is another object of the present invention to provide a design which is capable of immediately accommodating winds from any direction having a horizontal component, as stated earlier. It is an object that this immediate readiness of the present invention be achievable with no moving parts.

It is therefore an object of the present invention to provide a design which utilizes a minimum of moving parts for improved reliability. It is an object that necessary maintenance and replacement of any parts should be minimized, and the durability of the entire apparatus be vastly improved.

Naturally, further objects of the invention are disclosed throughout other areas of the specification and claims.

BRIEF DESCRIPTION OF THE DRAWINGS

The following descriptions and referenced drawings are for selected preferred embodiments of the present invention. Naturally, changes may be made to the disclosed embodiments while still falling within the scope and spirit of the present invention and the patent granted to its inventors.

DETAILED DESCRIPTION OF THE PREFERRED EMBODIMENTS

Figure 1:
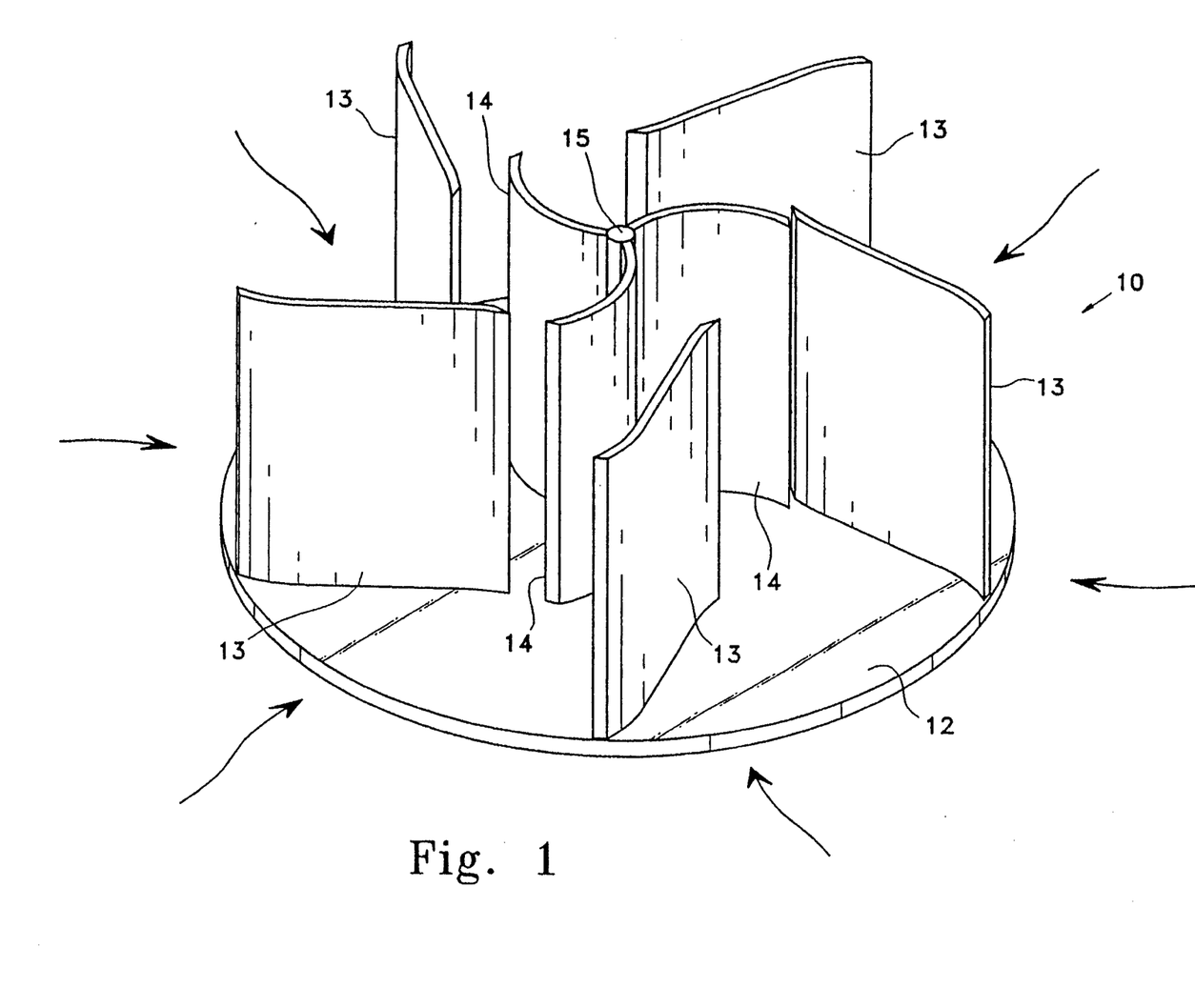
FIG. 1 is a perspective view of an embodiment of the invention with the top plate cut away to show the arrangement and relationship of the rotor blades and the stator blades. Some arrows have been used to indicate a mere fraction of the different current directions which can be harnessed by the present invention.

As can be seen from the drawings, the basic concepts of the present invention may be embodied in many different ways. FIG. 1 shows one preferred embodiment of wind turbine (10) having top plate (11, shown in FIG. 3), bottom plate (12), vertical shaft (15), five stator blades (13), and three rotor blades (14). Each component, except for shaft (15), is preferably made from a high quality alluminum alloy for light weight, and greater structural integrity. Shaft (15) is preferrably made of steel. To better explain, and for better comprehension, the various aspects of the present invention will be presented in a detailed discussion on each element, followed by a summary discussion on the apparatus, as the sum of its parts. While particular embodiments of the invention will be described, it will be obvious that changes and modifications may be made without departing from the broad aspects of the present invention.

Figure 2:
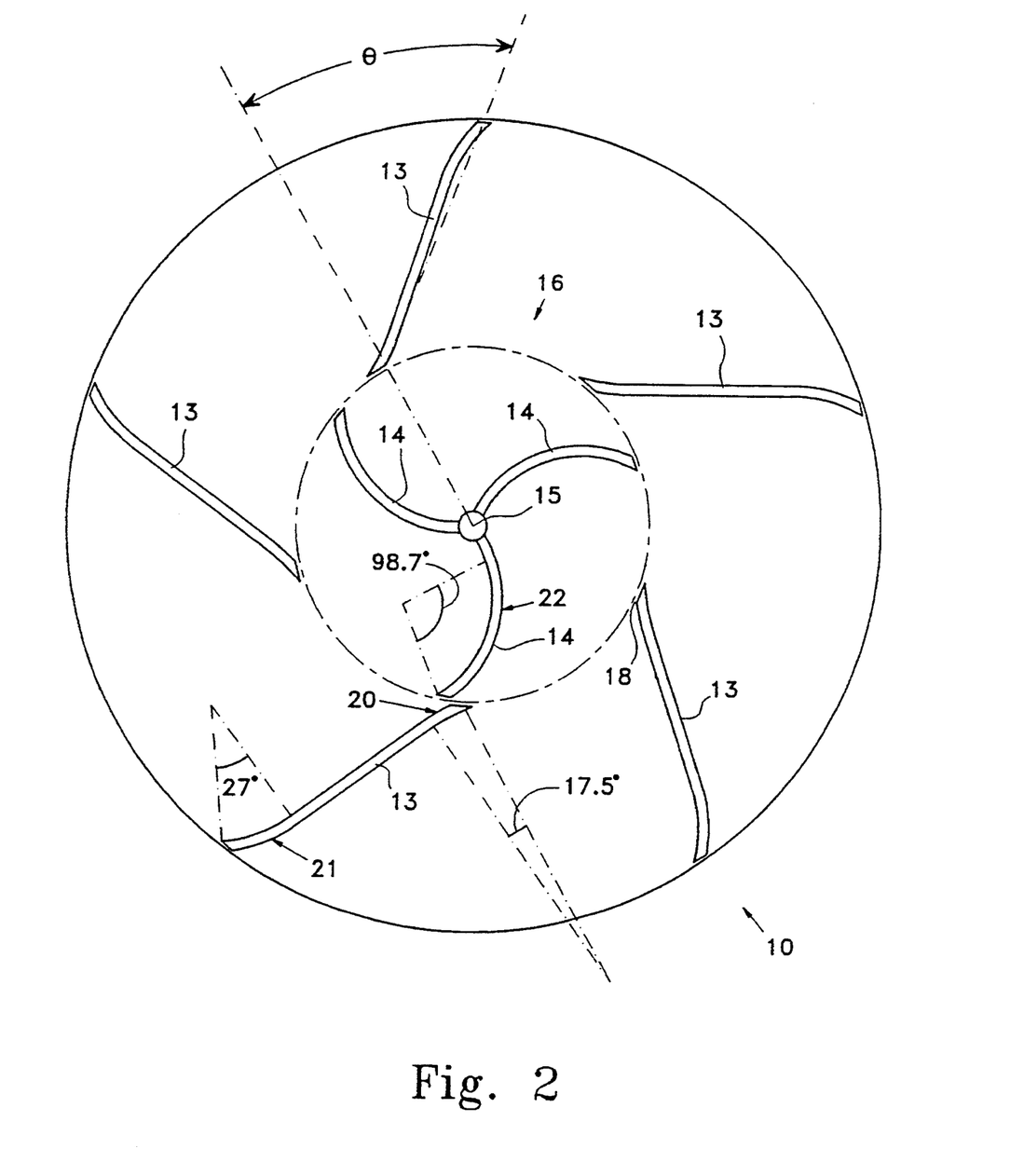
FIG. 2 is a top view of the embodiment shown in FIG. 1.
Figure 4:
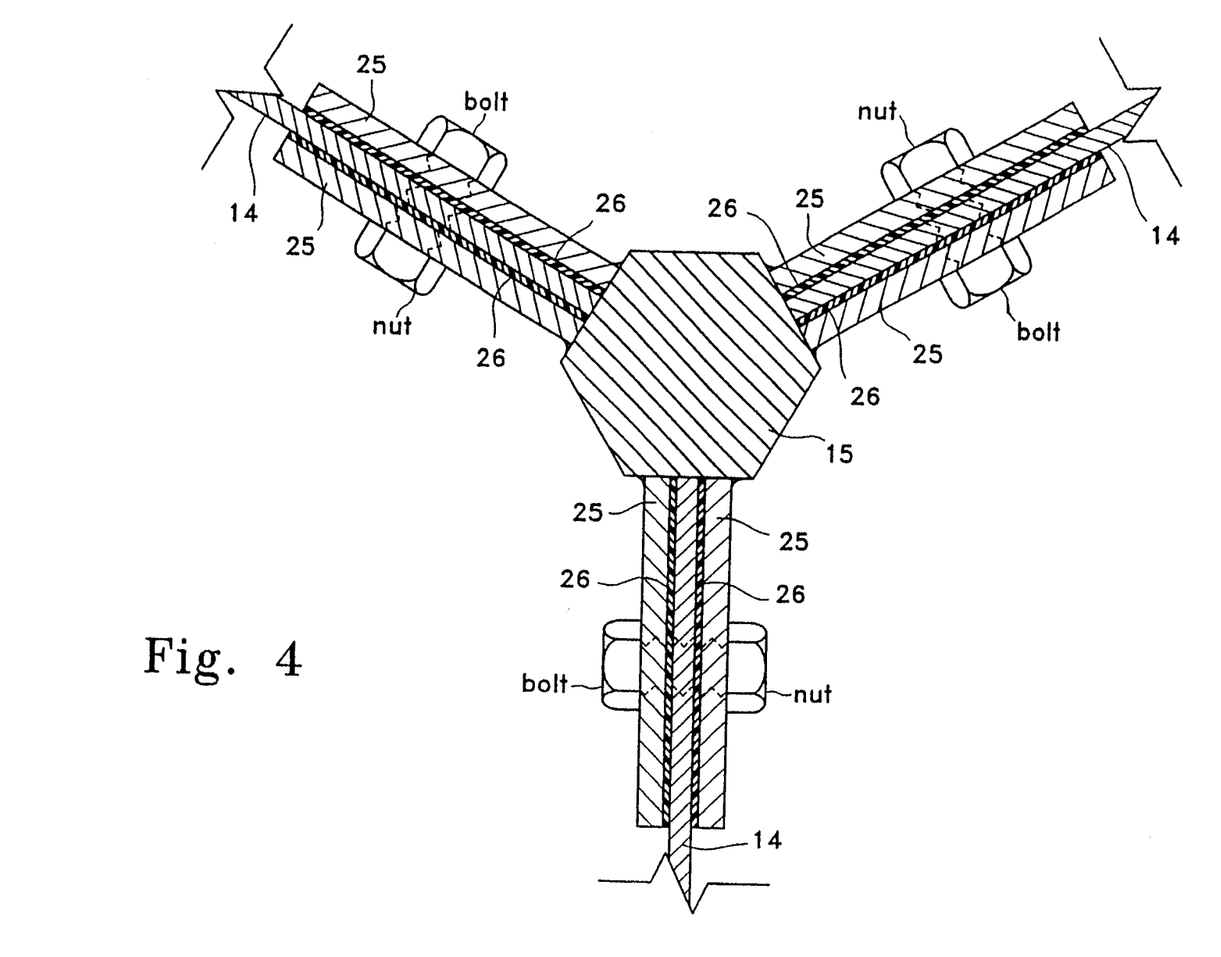
FIG. 4 is a top view of the rotor assembly showing one embodiment of the attachment of each rotor to the vertical turbine shaft.

Referring to FIGS. 2 and 4, rotor blades (14) can be seen to have curve (22) as a substantial component. In addition, rotor blades (14) are attached to vertical turbine shaft (15) via plates (25), which are in turn welded to shaft (15) along their lengths. Each rotor blade (14) is sandwiched between two pieces of teflon (26) (as shown in FIG. 4) (or similar friction reduction devices), and then bolts are run through plates (25), teflon (26), and rotor blades (14), as shown in FIG. 4. This design provides greater strength than welding rotors made of an equivalent weight of steel directly to shaft (15). FIG. 4 also shows that the cross-section of shaft (15) is preferrably hexagonal. Another anticipated attachment technique (not shown) uses a circular cross-section of shaft (15). Rotor blades (14) are attached to a hollow tubular casing in a fashion similar to the earlier method. The casing is then placed around shaft (15), leaving a slight gap between the casing and shaft. A number of spacers are then friction fit between shaft (15) and the casing to secure the entire rotor assembly. Naturally, a variety of other attachment techniques will work equally as well as that shown for the present embodiments.

While three rotor blades (14) are shown in the various drawings, it is anticipated by the present invention that as few as two blades, and as many as six blades may be employed. The spacing of blades (14) will vary according to the number used, following closely the simple formula $d = 360°/n$, where n is the number of rotors and d is the degrees from one rotor to the next. Vertical shaft (15), which may be considered an integral component of rotor assembly (16), connects turbine (10) to an electric generator (not shown). In another application shaft (15) may act directly on a water pump or other device (also not shown). Through rotation of shaft (15) power may be generated and used, or stored for later use. It should be understood that rotors (14) are fixed and stationary on shaft (15), and therefore shaft (15) is the only truly moving part of turbine (10).

In order for shaft (15) to turn, however, rotors (14) must be responsive to currents, which can then be translated into mechanical rotational energy. This goal has led to the design of curve (22), which is relatively simple to understand. If a rotor assembly of two flat blades spaced 180° apart is placed directly into a wind (using no stator assembly), because of the opposing nature of the two blades, applied forces on each side will be equal and little or no rotation will occur. Changing these blades to the design of the preferred embodiment will achieve an inequality of applied forces, and rotation will begin. The curvature can vary widely, preferably between 25° and 185°, with a preferred curvature of 98.7°. This preferred curvature was derived in laboratory conditions, through trial-and-error techniques; it may vary for different situations and conditions. In fact, while FIG. 2 is illustrative of a circular curvature, used in the present embodiment, hyperbolic and parabolic curvatures are certainly anticipated, and clearly fall within the scope and spirit of the patent granted on the present invention.

Figure 5:
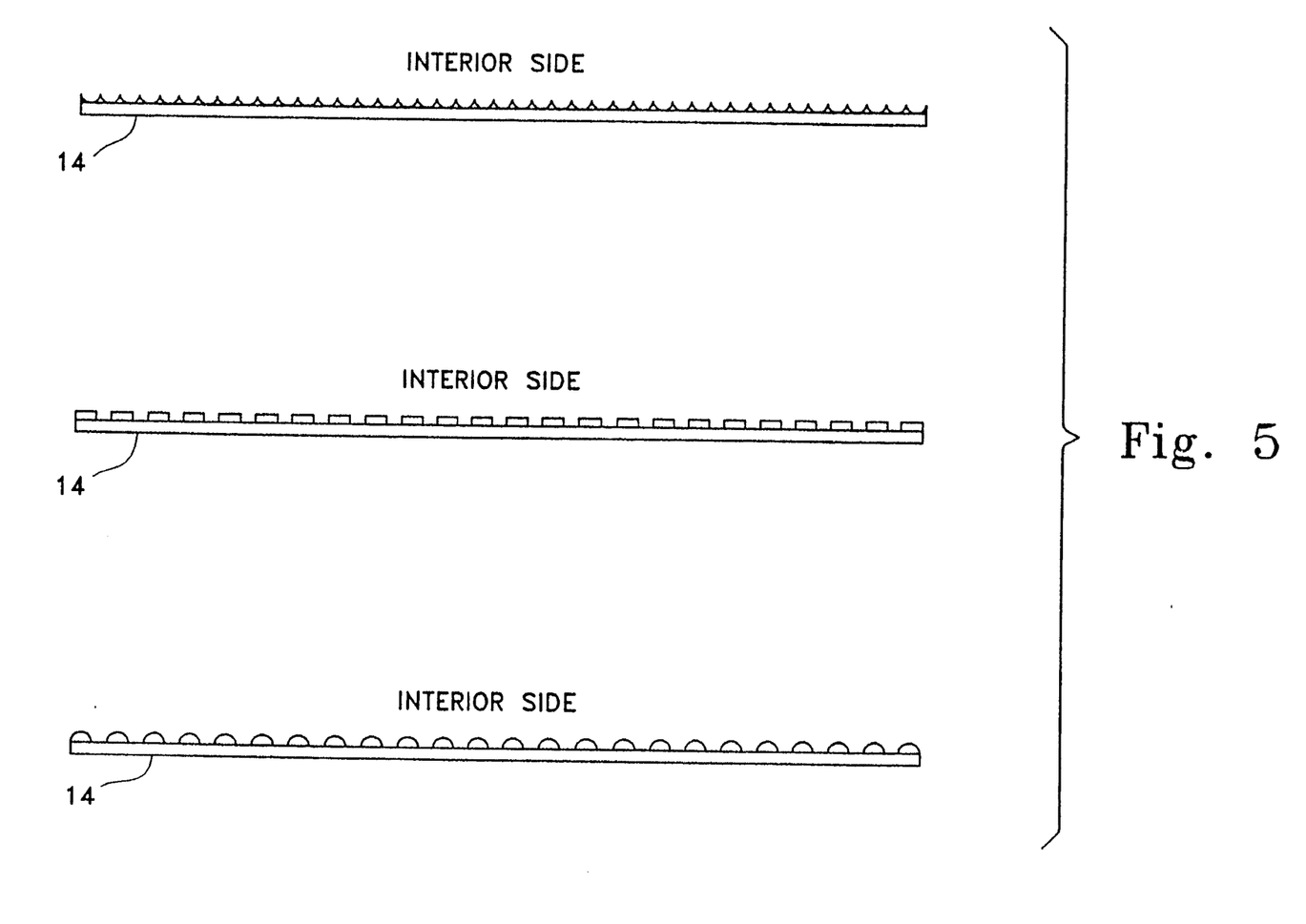
FIG. 5 is a close-up view of the edge of a single rotor blade having a textured interior surface for increasing the drag coefficient and providing greater rigidity.

To further assist this translation to rotational energy, one embodiment of the present invention uses a means for increasing the; drag coefficient on the inside (or cupped side) of rotor (14). An example of this means would be a textured surface, such as, but not limited to, ribs, bumps, ridges or the like. In addition, the rib and/or ridge design is used to reduce the weight of each stator. This allows the present invention to begin operation at lower wind speeds FIG. 5 shows a few anticipated embodiments of this texturing and ribbing.

Another key component of turbine (10) is stationary stators (13), shown more clearly in FIGS. 1, 2, 3 and 6. Referring to the top view shown in FIG. 2, it can be seen that each stator (13) is comprised of a double-curve, first curve (20) and second curve (21). As shown in the figures, by using a blade for stator (13), both the inner and outer surfaces of first curve (20) correspond. This is also true of the inner and outer surfaces of second curve (21). Also, as shown best in FIG. 1, each stator is fixed at multiple points, and therefore is not adjustable in any direction. Finally, as shown in the figures, the corresponding curves of the stators show opposing double curves, where the curve closet to the rotor assembly is left facing and the curve furthest from the rotor assembly is right facing. The reasons for the double-curve, and fixed attachment are many. First, the two aspects provide significant structural support for the present invention, allowing for operation at higher wind speeds. Secondly, and, very importantly, this additional structural support is provided without interfering with current flow and increasing the vorticity. Some prior art devices enhance structural integrity by adding supports and wall structures, in addition to their movable stators. Typically these devices can alter current flow, causing rough turbulent action. As those skilled in the relevant art are well aware, high vorticity or turbulent flow can be destructive and far less efficient than the more desirable laminar flow. Naturally, perfectly laminar flow is never achievable, as some degree of vorticity and therefore turbulent flow must exist in any design. By using only fixed stator blades (13), the present invention minimizes the vorticity of the currents as they enter and exit turbine (10).

Figure 6:
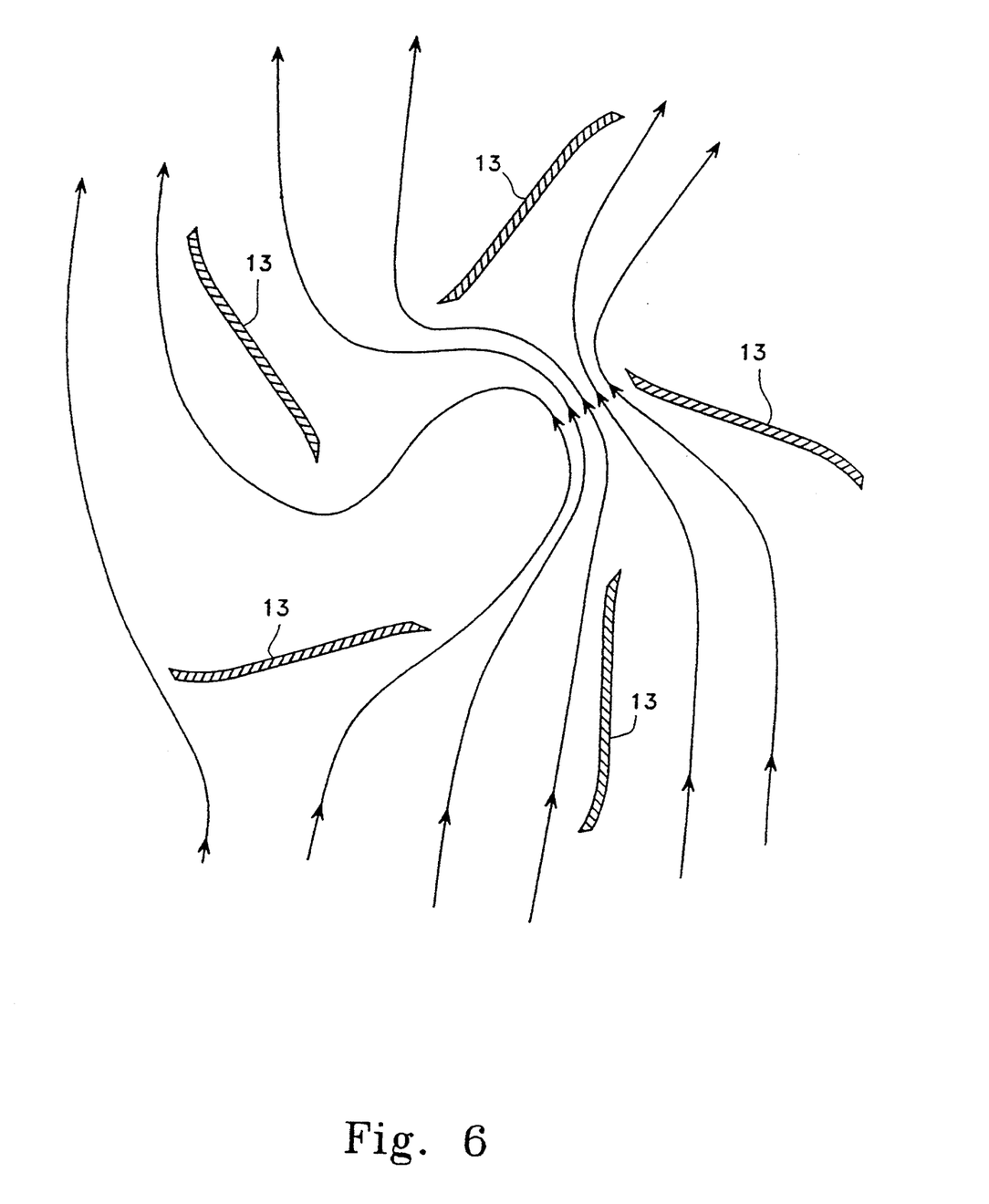
FIG. 6 is a top view of the stator blades showing the double-curve of each. The arrows illustrate the approximate directional nature of the stator blades on one set of currents entering and exiting from the turbine.

A third reason for fixed, double-curved stators (13) is that they have been found to produce the greatest rotational velocity in combination with rotor assembly (16). Straight and single curved rotors did not perform as well under laboratory conditions. It is anticipated that further refinements in shape may be generated using computer aided modeling. In the present embodiment, however, using more basic modeling techniques, the double-curve has been found to work best in most conditions. Further, while both curves (20 and 21) may vary within the range of 5° to 120°, the present embodiment uses 17.5° and 27° for first curve (20) and second curve (21), respectively, as shown in FIG. 2. Again these stator curvatures may vary for different situations and conditions. In fact, as is the stated case with the rotor curvature, while FIG. 6 illustrates circular curvature, hyperbolic and parabolic curvatures are certainly anticipated, and clearly fall within the scope and spirit of the patent granted on the present invention.

With respect to the number of stators (13), the multiple embodiments of the present invention may differ widely. In most instances it is desirable to maintain at least five stators on turbine (10). Referring to FIG. 2, it can be understood that a relationship exists between the radius of rotor assembly (16) and the width of the annulus occupied by stator blades (13). The ratio of this relationship is preferrably in the range of 2:1 and 1:2. Since, however, most conditions of use cannot be contemplated, it is certainly within reason to expect ratios of much different proportions, such as, but not limited to 1:3, 2:3, 3:2 and perhaps many others. The present preferred embodiment of turbine (10) is designed with five fixed stators (13) occupying an annulus with a width approximately twice the size of the radius of rotor assembly (16).

Another important consideration in designing the present embodiment of turbine (10) is the placement of each fixed stator (13). In order that they may function properly, directing wind toward and away from rotor assembly (16), angle (Θ) (shown in FIG. 3) must be carefully considered. For example, if angle (Θ) is too great, stators (13) begin to block too much current from rotors (14). If angle (Θ) is too small, the shielding effect is negligible and the destructive nature of gusting and swirling winds may diminish the rotational energy of assembly (16). The present embodiment is designed with angle (Θ) within the range from 10° to 90°. The variety of angles may work exceptionally for different desired goals, and designs.

Figure 3:
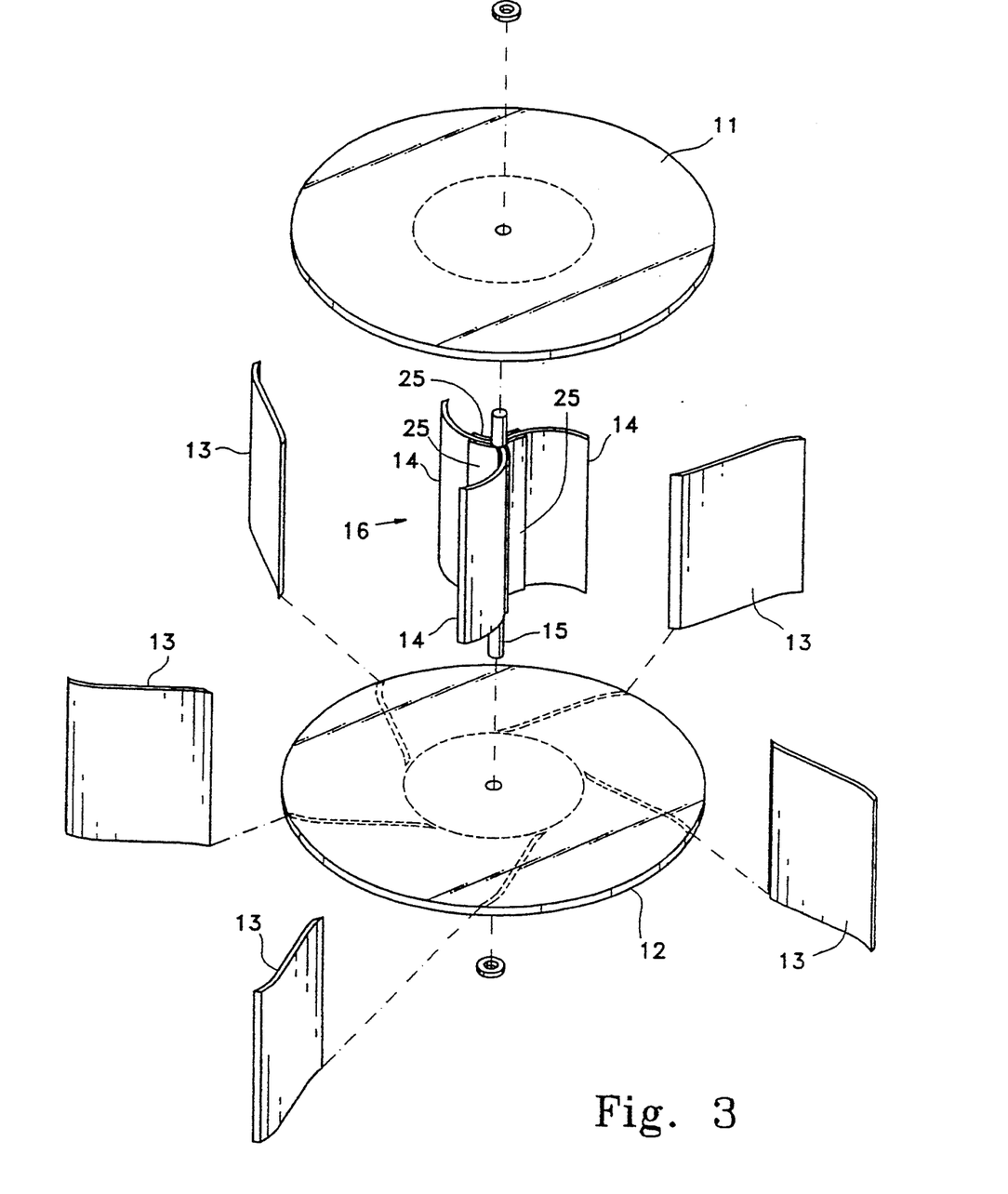
FIG. 3 is an exploded view of a similar embodiment having three rotor blades and five stator blades.

As mentioned previously, stators (13) add significantly to the structural integrity of turbine (10). This structural enhancement is achieved by mounting the top of each stator (13) to top plate (11), and the bottom of each stator (13) to bottom plate (12), as shown in FIG. 3. Naturally, the fact that each stator (13) has a double-curve adds to the stability of turbine (10). Top plate (11) and bottom plate (12) serve not only to maintain the pre-established orientation of each component, but also serve to maintain the directed currents flowing in a substantially horizontal fashion. This insures that the currents will engage rotors (14), rather than escape upward or downward from turbine (10). An additional benefit of top plate (11) and bottom plate (12) is that it also prevents vertical currents from impeding upon rotor assembly (16). Instead, these vertical currents can be somewhat deflected into a horizontal orientation, which may then pass either over, under, or through turbine (10). The circular shape of plates (11 and 12) is used so that the most affected area of turbine (10) is enclosed. Other shapes and sizes may be employed without departing from the scope and spirit of the present invention.

Having now completed a detailed discussion on each component of turbine (10) it is desirable to discuss the invention as a sum of its parts. Referring again to FIG. 3, the assembly of the various components can be seen and understood. While the attachment of adjacent components, such as rotors (14) to shaft (15), are shown in the various drawings to be fastened by welds, bolts, screws or the like, many other means may be appropriately implemented to achieve a successful design. Structural integrity, and durability should be major considerations when determining the desired method of attachment for all components.

Referring to the illustrative FIG. 6, the omnidirectional aspect of turbine (10) can be more clearly understood. Dividing turbine (10) into quarters (24) (shown in FIG. 2) would necessarily reveal that each quarter possesses at least one stator (13). This aspect combined with the angled attachment of each stator (13) permits turbine (10) to handle currents having a horizontal component within a full 360° range. This capability is immediate, without the necessity of manual, natural, mechanical, or electrical manipulation of the stator angle like most prior art devices. FIG. 6 shows but one incoming wind direction and its simplified flow path, including vorticity. Using this particular illustration there are approximately 8640 wind path variations possible, using one degree of difference for each variation. In reality there are an infinite number of variations.

In manufacture, turbine (10) may be designed and constructed with tight tolerances in spacing (18) between rotors (14) and stators (13), and also between rotors (14) and top and bottom plates (11 and 12). The minimum spacing is conducive to more effective use of currents, allowing less escape than if larger spacing were used. The current prototype model of turbine (10) is approximately six feet tall, and eight feet in diameter. It has been tested in operation up to 130 mph.

Figure 7:
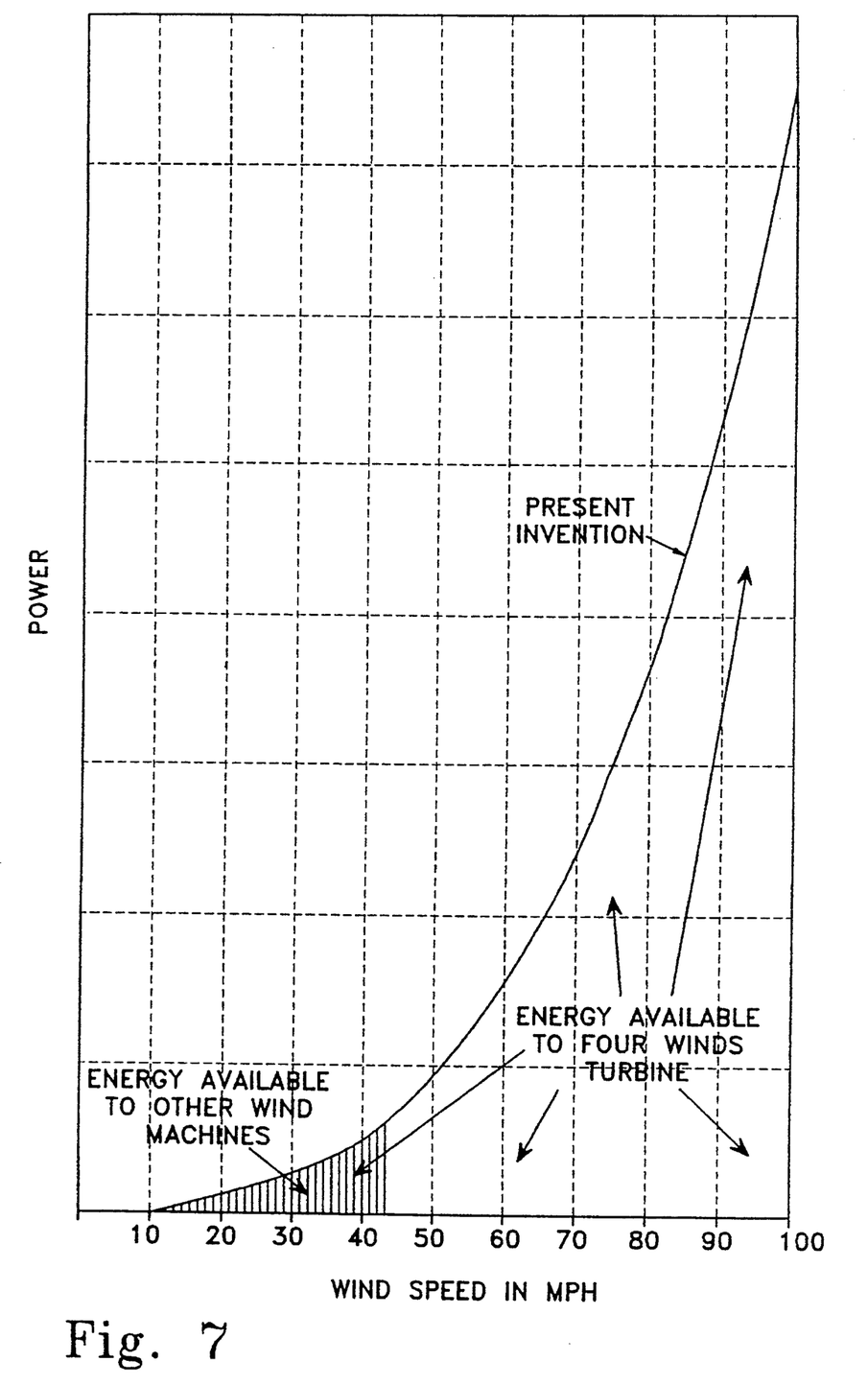
FIG. 7 is a graph illustrating the operation of typical prior art devices and the present invention during various wind velocities.

Referring to FIG. 7, the overall advantage of the present invention is best illustrated. While prior art devices are capable of withstanding high-wind conditions, they have not focussed on the ability to operate during such conditions. Conversely, the present invention, as is clearly dipicted in FIG. 7, is able to thrive, and not just survive. Without question, this ability to operate during high-winds is one reason the present invention is able to present a commercially viable alternative power source.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied.

We claim:

1. A wind turbine comprising:
   a. a rotating vertical shaft;
   b. a plurality of curved, single-walled, vertical rotor blades attached directly to said shaft;
   c. top and bottom plates mounted above and below said rotor blades; and
   d. a plurality of passive stationary blades with corresponding and opposing double curves arranged circumferentially about said rotor blades.

2. A wind turbine as described in claim 1 wherein said stationary blades comprise a curved vertical surface.

3. A wind turbine as described in claim 1 wherein said stationary blades comprise a means for improving the ability of air currents to escape from said rotor blades.

4. A wind turbine as described in claim 1 wherein said vertical rotor blades comprise a means for increasing the drag coefficient on the inside of said rotor blades.

5. A wind turbine as described in claim 4 wherein said means for increasing the drag coefficient on the inside of said rotor blades comprises a textured inside surface.

6. A wind turbine as described in claim 5 wherein said textured inside surface comprises ribs.

7. A wind turbine as described in claim 1 wherein said top and bottom plates comprise support provided solely by said stationary blades.

8. A wind turbine as described in claim 1 or 2 wherein adjacent stationary blades define a wind pathway, and wherein each quarter of said turbine comprises at least one wind pathway.

9. A wind turbine comprising:
   a. an upper plate and a lower plate, wherein said plates lay within distinct horizontal planes, and wherein said planes are substantially parallel;
   b. a vertical shaft passing through said upper and lower plates in proximity to their respective centers;
   c. a plurality of curved vertical rotor blades, wherein said rotor blades are responsive to air currents; and
   d. a passive means for a directing air currents toward said rotor blades, wherein said passive means for directing is correspondingly and opposingly double curved and permanently fixed circumferentially about said rotor blades.

10. A wind turbine as described in claim 9 wherein said vertical rotor blades comprise a means for increasing the drag coefficient on the inside of said curved vertical surface of said rotor blades.

11. A wind turbine as described in claim 10 wherein said means for increasing the drag coefficient on the inside of said rotor blades comprises a textured inside surface.

12. A wind turbine as described in claim 11 wherein said textured inside surface comprises ribs.

13. A wind turbine as described in claim 10 wherein said passive means for directing comprises a plurality of passive stator blades.

14. A wind turbine as described in claim 13 wherein said passive stator blades comprise a means for improving the ability of air currents to escape from said rotor blades.

15. A wind turbine as described in claim 14 wherein said means for improving the ability of air currents to escape comprises a correspondingly curved surface on said passive stator blades.

16. A wind turbine as described in claim 13 wherein said passive stator blades comprise a means for optimizing the rotational velocity imparted upon said shaft by said rotor blades.

17. A wind turbine as described in claim 16 wherein said means for optimizing comprises a correspondingly curved surface on said passive stator blades.

18. A wind turbine as described in claim 9 wherein said passive means for directing air currents is omnidirectional.

19. A wind turbine as described in claim 1 or 9 wherein said curve of said rotor blades is in the range of 25° to 185°.

20. A wind turbine as described in claim 19 wherein said curve of said motor blade is preferably 98.7°.

21. A wind turbine comprising:
   a. a central vertical shaft;
   b. means for imparting rotation upon said shaft, wherein said means for imparting is responsive to air currents;
   c. means for permitting passage of air currents into and out of said wind turbine; and
   d. a passive means for directing air currents to said means for imparting rotation, wherein said passive means for directing is correspondingly and opposingly double curved.

22. A wind turbine as described in claim 21 and further comprising a passive means for directing air currents from said means for imparting rotation.

23. A wind turbine as described in claim 21 and further comprising means for maintaining currents in a substantially horizontal direction perpendicular to said shaft.

24. A wind turbine as described in claim 23 wherein said means for maintaining comprises an upper plate and a lower plate positioned about said means for imparting rotation, and wherein said upper and lower plates comprise support provided solely by said passive means for directing.

25. A wind turbine as described in claim 21 wherein said means for imparting rotation is responsive at all times to all air currents having a component substantially perpendicular to said shaft.

26. A wind turbine as described in claim 21 wherein said means for permitting passage encloses a full 360° about said means for imparting rotation.

27. A wind turbine as described in claim 26 wherein said means for permitting passage comprises four equal quarters, and wherein said passive means for directing is present at all times in each quarter.

28. A wind turbine as described in claim 21 wherein said vertical rotor blades comprise a means for increasing the drag coefficient on the inside of said curved vertical surface of said rotor blades.

29. A wind turbine as described in claim 28 wherein said means for increasing the drag coefficient on the inside of said rotor blades comprises a textured inside surface.

30. A wind turbine as described in claim 29 wherein said textured inside surface comprises ribs.

31. A wind turbine as described in claim 21 wherein said passive means for directing comprises a plurality of fixed stators.

32. A wind turbine as described in claim 21 wherein one curve of said stator is preferably 17.5°, and wherein another curve of said stator is preferably 27°.

33. A wind turbine comprising:
   a. a central vertical shaft;
   b. means for operating said turbine in high wind conditions comprising:
      (1) a rotor assembly attached directly to said shaft, and wherein said assembly responds to wind currents by imparting rotation upon said shaft;
      (2) a plurality of fixed correspondingly and opposingly double curved stators;
      (3) top and bottom plates enclosing said rotor assembly; and
   c. passive means for permitting passage of high wind currents into and out of said turbine.

34. A wind turbine as described in claim 33 wherein said means for permitting passage comprises a space defined by adjacent fixed stators, and wherein each quarter of said turbine comprises at least one means for permitting passage of high wind currents.

35. A wind turbine as described in claim 33 wherein said top and bottom plates comprise support provided solely by said fixed stators.

36. A wind turbine as described in claim 33 wherein said rotor assembly is responsive at all times to all air currents having a component substantially perpendicular to said shaft.

37. A wind turbine as described in claim 33 wherein said rotor assembly is capable of operation in wind currents having velocities of as much as 130 miles per hour.

38. A wind turbine comprising:
   a. a central vertical shaft;
   b. a plurality of vertical rotor blades attached directly to said vertical shaft, wherein said rotor blades are curved, and wherein said blades are responsive to air currents and capable of imparting rotation upon said shaft during periods of sufficient air flow;
   c. a plurality of passive vertical stator blades circumferentially arranged about a circle inscribed by the outer edges of said rotor blades, wherein said stator blades are double curved, wherein said stator blades have curved inner and outer surfaces which correspond, and wherein said stator blades direct air currents toward said rotor blades and simultaneously away from said rotor blades; and
   d. an upper horizontal surface mounted above said rotor and stator blades;
   e. a lower horizontal surface mounted below said rotor and stator blades, wherein said upper and said lower surfaces are secured only to said vertical stator blades.

39. A wind turbine as described in claim 1, 9, 21, 33, or 38 wherein said vertical shaft is the only moving part of said turbine.

40. A wind turbine as described in claim 1, 9, 21, 33, or 38 wherein said wind turbine is immediately capable of accommodating wind currents from any direction having a horizontal component.

41. A wind turbine as described in claim 40 wherein said wind turbine is immediately capable of responding to a change in wind direction.

* * * * *